United States Patent [19]
Van Damme

[11] 3,918,772
[45] Nov. 11, 1975

[54] GUIDE ASSEMBLY WITH THIN WALL INSERT

[75] Inventor: Joseph Van Damme, Sharon, Mass.

[73] Assignee: The Foxboro Company, Foxboro, Mass.

[22] Filed: Sept. 16, 1974

[21] Appl. No.: 506,368

[52] U.S. Cl. .............................. 308/4 R; 308/237 R
[51] Int. Cl.² ........................................ F16C 29/02
[58] Field of Search........ 308/4 R, 239, 240, 237 R, 308/237 A; 267/166, 180

[56] References Cited
UNITED STATES PATENTS
3,185,531   5/1965   Modrey .............................. 308/4 R

*Primary Examiner*—M. Henson Wood, Jr.
*Assistant Examiner*—Gene A. Church
*Attorney, Agent, or Firm*—Frank J. Fleming

[57] ABSTRACT

A guide assembly for guiding a movable shaft having a bearing surface insert comprising a flat resilient metal strip wound in helical form.

2 Claims, 3 Drawing Figures

GUIDE ASSEMBLY WITH THIN WALL INSERT

BACKGROUND OF THE INVENTION

1. Field of the Invention

This invention relates to improvements in a guide assembly for guiding a movable shaft. This invention is more particularly related to improvements in a guide assembly having a thin wall insert type of bearing surface.

2. Description of the Prior Art

It has been common practice in the past to construct guide assemblies by pressing a cylindrical metal bushing into a support member. A thin plastic sheet material having suitable lubricating and wear properties has been used instead of the cylindrical metal bushing for applications subjected to nominal temperatures. The substitution of a thin metal sheet interchangeably for the thin plastic sheet material presents many problems which are, in part, discussed in Thomas U.S. Pat. No. 2,618,050.

SUMMARY OF THE INVENTION

This invention is described in relation to the problems encountered in valves of the type suitable for use on industrial processes. In addition to being suitable for the mechanical problem involved such as wear and bearing characteristics, the wetted parts of such a valve must be impervious to the process fluids and withstand the temperatures encountered. In the guide assembly for guiding the stem of a valve, a thin sheet of plastic material is often used for the bearing insert because such material has the mechanical properties required. However, although the plastic material has the mechanical properties required and is impervious to a great many process fluids, it will not withstand the high temperatures encountered by some processes. Hence, it becomes necessary to use metal bearing inserts in valves applied to processes involving temperatures beyond the range of the plastic bearing inserts.

In order to reduce the inventory of valve parts necessary to meet all temperature ranges, it is important that the plastic bearing insert and the metal bearing be interchangeable. To meet this requirement, the metal bearing insert must have the same thickness as that of the plastic bearing insert it is to replace, which may be in the order of 0.040 inches. The selection of a metal for use in valves is limited to those which are impervious to the process fluids and are hard enough to serve as a bearing surface. Metals meeting these requirements which can be deep drawn into bushings having the required thin wall are not at present available unless alloyed in special batches with the resulting excessive cost. Mainly due to the hardness requirement, it is not economically practical to machine a thin wall bushing from bar stock. It is difficult to form a bearing insert having the required true circular form from a thin sheet of the type of metal meeting the above requirements, especially at the edges of the sheet.

Accordingly, it is an object of this invention to provide a guide assembly having a metal bearing insert that is interchangeable with a thin wall plastic bearing insert. It is a further object of this invention to provide a guide assembly having a thin wall metal bearing insert that is economical to manufacture from metals which are impervious to a great many process fluids and are hard enough to serve as a bearing surface. It is still another object of this invention to provide a guide assembly having a thin wall metal bearing insert that is easily inserted into and removed from the guide support member.

The present invention circumvents the above discussed problems by using a length of annealed flat wire of a suitable alloy, such as 420 stainless steel. The bearing insert is made by winding the wire into a helical coil having an outside diameter somewhat larger than the diameter of the hole into which it is to be inserted. The coil is wound with at least a part of a turn at each end more than required and the excess is cut off. By this technique, the bearing insert has a true circular form throughout its entire length. The bearing insert is then heat treated to impart therein the desired hardness and spring characteristics. In order to insert the bearing insert into the hole in the support member, the outside diameter is reduced by manually winding the coil inwardly. When the bearing insert is in position and released, it expands to seat itself against the hole surface and is held firmly in place by the radial spring thrust of the bushing insert. Due to the resilience of the bearing insert, each turn of the helical coil retains substantially a true circular form when flexed. When seated in place, the inside diameter of the bearing insert is mainly determined by the inside diameter of the hole and the thickness of the flat wire. By selecting these dimensions and tolerances with care, a movable fit is provided between the inside surface of the bearing insert and the movable shaft, which in the example described above is the valve stem. The thickness of the flat wire may be selected so that the resulting metal bearing insert is interchangeable with a bearing insert made of a thin sheet of plastic material.

The metal bearing insert is not only easily inserted in the hole of the support member, but also easily removed when it requires cleaning or replacing. The bearing insert is removed by manually winding the coil inwardly to reduce its diameter. The edges of the flat wire act as scrapers to clean dirt from the movable shaft. Rounded edges are preferred to prevent scratching the movable shaft. The bearing insert is easily cleaned by stretching it so the coils are separated to remove the dirt that may have collected between coils.

DESCRIPTION OF THE DRAWINGS

The objects and advantages of this invention will be more fully understood from the description taken in connection with the accompanying drawings, wherein.

DESCRIPTION OF PREFERRED EMBODIMENTS

Figure 1:
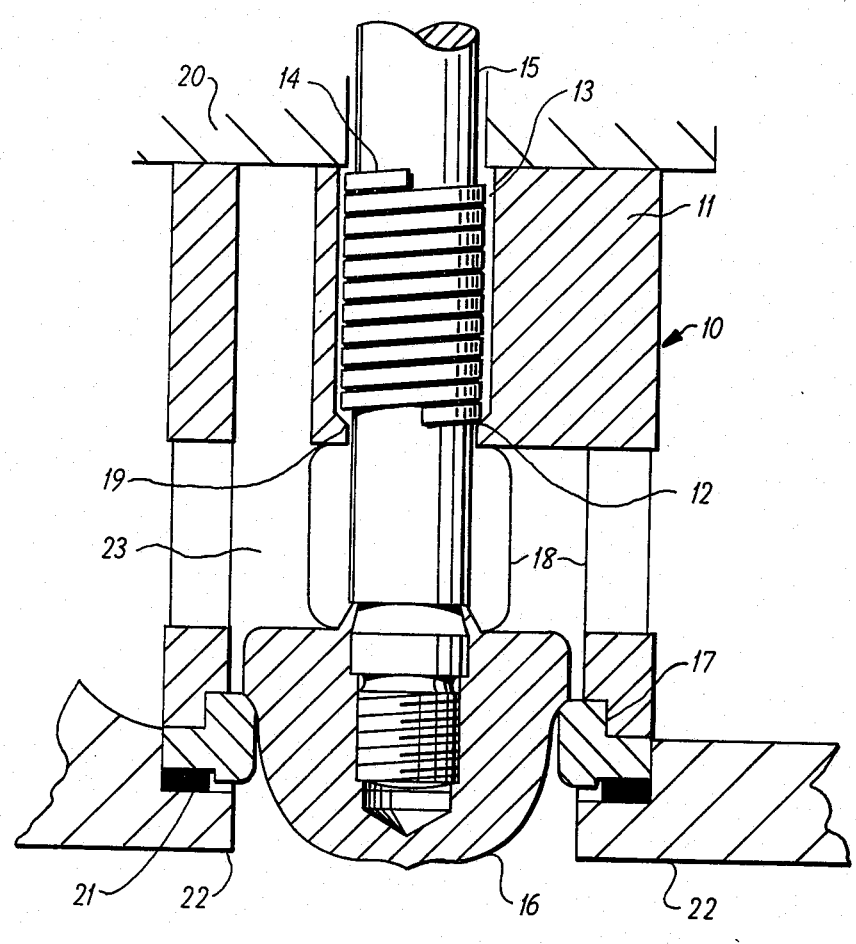
FIG. 1 is a cutaway view of the guide assembly in a valve.

Referring to FIG. 1, the present invention is shown in relation to use in a valve 10 of a type commonly used in industrial processes. Only those parts of the valve 10 which are necessary to an understanding of the invention are shown in FIG. 1. In describing FIG. 1, standard valve nomenclature is used when a part is first identified followed by the term which will thereafter be used to identify the part. In the valve 10, the cage or support member 11, seat ring 17 and gasket 21 are clamped in place between bonnet 20 and body 22. A stem or movable shaft 15 extends through the bonnet 20 and a passage 12 in support member 11 into chamber 23 in the support member 11. A plug 16 is attached to the end of movable shaft 15. In operation, the movable member 15 moves axially to carry plug 16 towards and away from seat ring 17 and thereby regulate the flow of process fluid into or out of chamber 23. Passage 12 comprises of a cylindrical hole 13 for a portion of its length. The cylindrical hole 13 terminates in the passage to form a shoulder 19. A bearing insert 14 is seated in cylindrical hole 13 to act as a bearing for guiding the movement of movable shaft 15. The bonnet 20 and shoulder 19 act as restraining means to prevent movement of the bearing insert 14 in an axial direction. The support member 11 is provided with ports 18 through which the process fluid flows into or out of chamber 23.

The bearing insert 14 is exposed to the process fluid in chamber 23. It is therefore necessary to select a material for the bearing insert 14 that is both impervious to the process fluid and hard enough to stand up in service as a bearing. One metal which may be heat treated to the necessary hardness and is impervious to a great many of the fluids encountered in industrial processes is 420 stainless steel alloy. This alloy is commercially available in annealed strip or wire form to thickness tolerances of plus or minus 0.001 inches.

Figure 2:
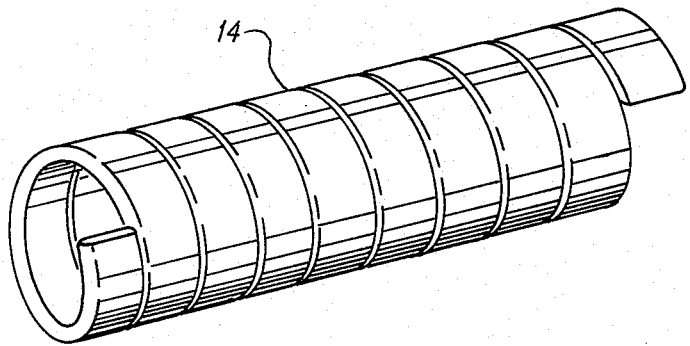
FIG. 2 is an isometric view of the bearing insert.

Referring to FIG. 2, the bearing insert is shown in its final form a helical coil heat treated to impart the desired hardness and spring characteristics thereto.

Figure 3:
FIG. 3 is a cross-section of the flat wire used to make the insert.

In FIG. 3, the thin flat wire 14a is a cross-section of the wire used in bushing insert 14. The details of the manufacture of the bushing insert and the method of inserting it in the cylindrical hole 13 of the support member 11 are adequately described hereinabove.

In the foregoing specification, a preferred embodiment of the invention has been described. It will be readily apparent to those skilled in the art that this invention is not limited to use in valves, but has many other uses including those involving rotary motion. It is also readily apparent that the invention is not limited to the shape of the wire shown or the alloy mentioned herein.

What is claimed is:

1. A guide assembly for guiding a movable shaft, comprising, in combination:
   a support member having a passage adapted to receive said movable shaft;
   said passage having a cylindrical hole of a predetermined diameter for a portion of its length;
   a bearing insert, comprising a thin flat strip of resilient metal wire wound edgewise in a helical coil form, seated in said cylindrical hole of said passage with the outer flat surface of said thin flat strip of resilient metal wire in contact with the portion of the surface of said cylindrical hole having a predetermined diameter and held firmly in contact therewith by radial spring thrust to form a firm cylindrical bearing surface;
   said thin flat strip of resilient metal wire having a predetermined thickness whereby when seated against the portion of said cylindrical hole having a predetermined diameter, the resulting inside diameter of said cylindrical bearing surface provides a moving fit for said movable shaft.

2. A guide assembly in accordance with claim 1 having restraining means for preventing movement of said bearing insert in an axial direction.

\* \* \* \* \*